Nov. 3, 1970

T. S. ZAJAC 3,537,680

CONTROL VALVE

Filed Feb. 26, 1968

INVENTOR
THEODORE S. ZAJAC

ATTORNEYS.

Nov. 3, 1970        T. S. ZAJAC        3,537,680
CONTROL VALVE
Filed Feb. 26, 1968        2 Sheets-Sheet 2

INVENTOR
THEODORE S. ZAJAC
BY Woodling, Krost,
Granger and Krost
ATTORNEYS

United States Patent Office 3,537,680
Patented Nov. 3, 1970

3,537,680
CONTROL VALVE
Theodore S. Zajac, Rocky River, Ohio, assignor, by mesne assignments, to Parker-Hannifin Corporation, Cleveland, Ohio, a corporation of Ohio
Filed Feb. 26, 1968, Ser. No. 708,184
Int. Cl. F16k 3/10
U.S. Cl. 251—172
11 Claims

ABSTRACT OF THE DISCLOSURE

A valve mechanism having a sealing sleeve disposed in a port of the valve body adapted to sealingly engage a rotatable valve face in the cavity of the valve body, the sleeve having an annular shoulder extending radially outward therefrom and subjected to fluid pressure from the discharge side of the port leaking between the sleeve and port wall, which fluid pressure urges the sleeve toward the valve face, the sleeve having opposite end surfaces subject, respectively, to the fluid pressure on the inlet side and the discharge side of the port, the port wall having a groove formed therein outwardly of the sleeve, a resilient sealing member disposed in said groove and extending radially inward into sealing engagement with the sleeve, the sealing member being supported by the port wall against fluid pressure from the discharge side of the port to direct such discharge fluid pressure against said annular shoulder, and a spring biasing the sleeve toward said valve face.

---

An object of my invention is to provide a rotatable valve having approved means for maintaining a good sealing contact between the stationary part and the movable part.

Another object is the provision of an improved sealing sleeve disposed at the port of a valve passageway and facing the movable face part of the valve.

Another object is the provision for accommodating the structure of a sealing sleeve in a valve to variable conditions in the valve, that is, to variation in the pressures of the fluid within the valve.

Another object is the provision for obtaining and maintaining an approved sealing contact between the movable sleeve in a valve port and the face of the rotatable part of the valve.

Another object is the provision of a valve structure for obtaining improved operating results.

Other objects and a fuller understanding of my invention may be had by referring to the accompanying drawings in which.

Figures 1, 2:
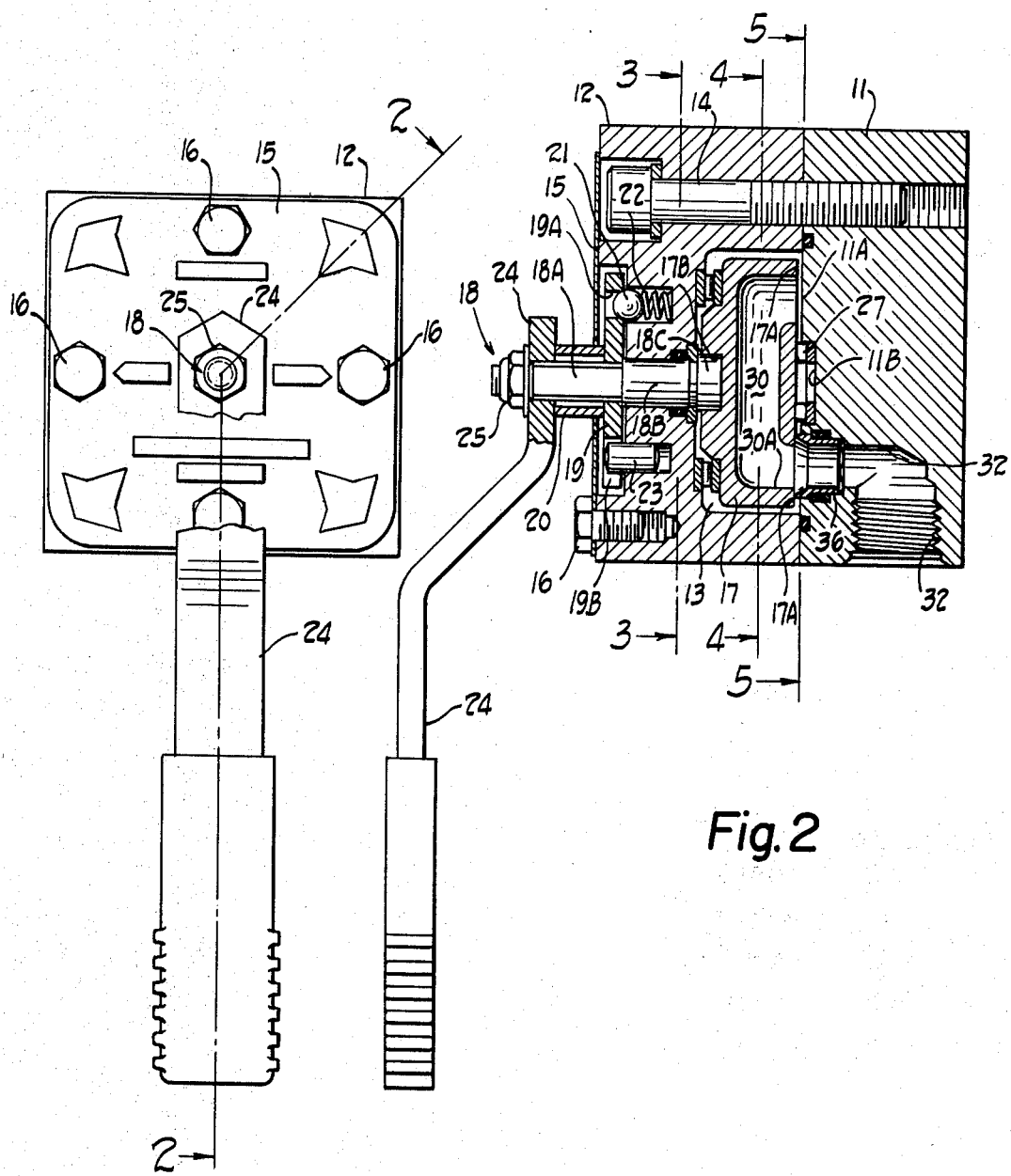
FIG. 1 is a plan view looking down upon a preferred embodiment of my control valve and shown by way of example.
FIG. 2 is a longitudinal view, partially in section, taken through the line 2—2 of FIG. 1.
Figure 3:
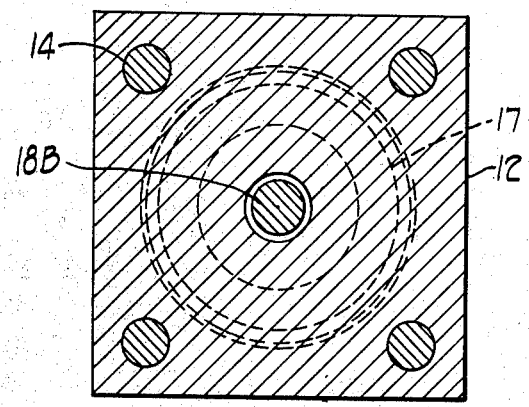
FIG. 3 is a cross-sectional view looking in the direction of the arrows 3—3 of FIG. 2.

My control valve has a body made up of a lower portion 11 and an upper portion 12 having a cavity 13 formed therein. The body portions 11 and 12 are held firmly together in sealed engagement by four bolts 14. Suitable seals provide sealing engagement between the portions 11 and 12. Disposed over the upper portion of the body portion 11 is a cover plate 15 held thereto by four cap screws 16, the cover plate carrying indicia thereon.

Mounted within the central cavity 13 is a rotatable valve part 17, which is adapted to be rotated upon its axis. The valve part 17 has a valve face 17A which in FIG. 2 is directed downwardly to operate a fixed face 11A of the lower body portion 11. As seen in FIG. 2, there is a space between the face 17A and the face 11A.

Provided in the upper portion of the valve part 17, opposite of its face 17A, is a non-circular socket 17B positioned at the axis of the valve part 17. In axial alignment with the valve part 17 there is an actuating valve stem 18. A non-circular head 18C fits within the non-circular socket 17B whereby rotation of the stem 18 also rotates the valve part 17. The valve stem 18 has a cylindrical portion 18B which is disposed to slidably rotate in an opening extending through the upper wall of body portion 12. Suitable seals and retaining rings seal the valve stem 18 and also hold it in the position illustrated in the drawings.

The valve stem 18 has an upper non-circular portion 18A and a valve handle 24 is non-rotatively secured to this upper portion 18A by a nut 25 whereby swinging of the handle 24 about the axis of the stem 18 rotates the valve stem 18 on its axis.

An indexing plate 19 is disposed over the body portion 12 and is non-rotatively secured to the non-circular portion 18A whereby rotation of the stem 18 rotates the plate 19 with it. A sleeve 20 welded or otherwise secured to the plate 19 revolves with it about the axis of the stem 18 and provides means for spacing the handle 24 above the valve body as shown.

The plate 19 has a plurality of detent holes 19A formed therein. Disposed in a dwell in the body portion 12 is a detent ball 21 which is biased upwardly against the plate 19 by a spring 22. Thus, the ball 21 tends to maintain the plate 19 and, hence, the stem 18 and valve part 17 in predetermined positions. But the bias of this spring 22 may be overcome whereby the handle 24 may be swung and the valve part 17 successively rotated.

Also disposed in the plate 19 is an arcuate slot or cutaway portion 19B which accommodates a limiting pin 23 held in a dwell in body portion 12 at a location diametrically opposite of the location of the ball 21. The pin 23, in cooperation with the arcuate slot 19B, permits a limited revolving of the the plate 19 and, hence, a limited amount of swinging of the handle 24.

Disposed between the upper wall of valve part 17 and the lower wall of upper portion 12 defining the cavity 13, there is a roller bearing assembly 26. Also between the valve face 17A and the fixed face 11A of lower body portion 11 there is a lower bearing assembly 27. The lower bearing assembly 27 is held centrally within a dwell 11B in the lower body portion 11. In this way, the valve part 17 may be freely rotated on its axis with a minimum of frictional resistance.

Figure 4:
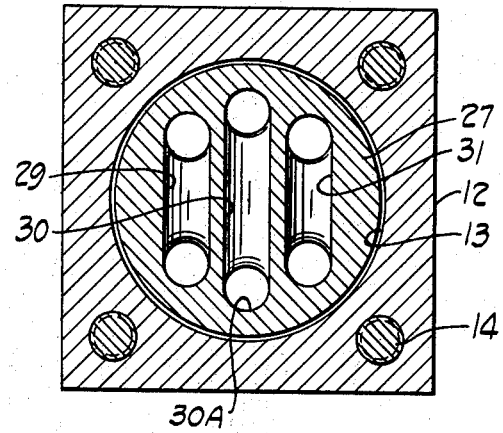
FIG. 4 is a cross-sectional view looking in the direction of arrows 4—4 of FIG. 2.

In the valve part 17 illustrated by way of example, there are three transverse conduits 29, 30, and 31, extending therethrough as illustrated in FIGs. 2 and 4. The opposite ends of each conduit are turned and directed downwardly to open at the valve face 17A and opposite of the fixed face 11A. It is understood that there may be more or less conduits provided in the rotatable valve part 17. One of the openings of a conduit in valve part 17 is the opening 30A at one end of the conduit 30. For purposes of simplicity of illustration and description, the present disclosure is partly directed to the conduit opening 30A and to the port and parts associated therewith. It is to be understood, of course, in the disclosure and description that this one area of this whole valve may be repeated in association with the ports and openings at other parts of the whole mechanism.

Figure 5:
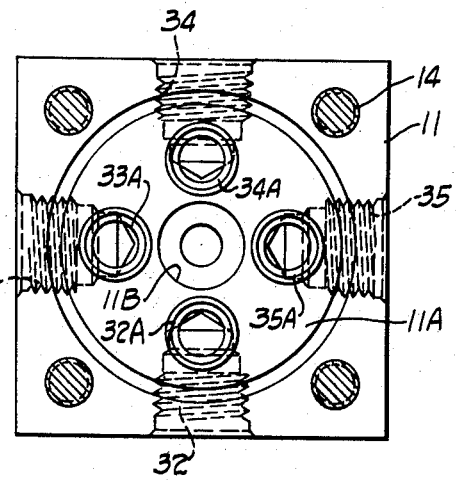
FIG. 5 is a cross-sectional view looking in the direction of the arrows 5—5 of FIG. 2.

As seen in FIGS. 2 and 5, there are shown in the body portion 11A of the valve herein shown and described by way of illustration, four passageways. These are, first, fluid passageway 32; second, fluid passageway 33; third, fluid passageway 34; and fourth, fluid passageway 35. Each passageway has a port extending upwardly and opening at the first face 11A of the body portion 11. The passageway 32 terminates at the port 32A, passageway 33 terminates at the port 33A, passageway 34 terminates at the port 34A, and passageway 35 terminates with the port 35A. The structural arrangement of each port and of the sealing sleeve mounted therein is similar so is not herein repeated.

Figure 6:
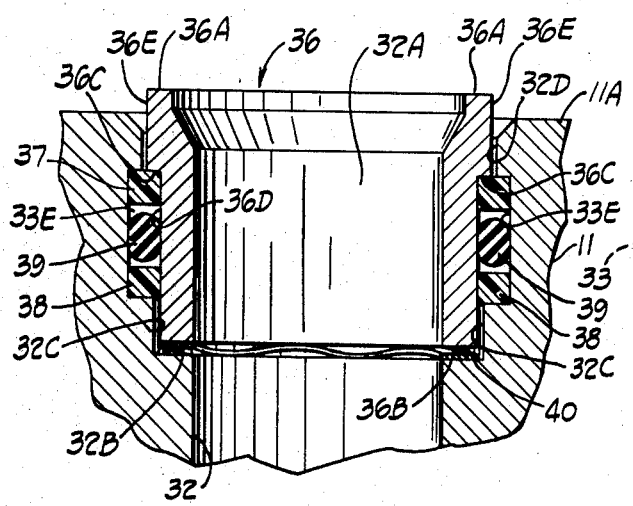
FIG. 6 is an enlarged sectional view taken axially through the port of a fluid passageway in my valve and through the sealing sleeve mounted therein.

Shown in FIGS. 2 and 6 there is shown mounted in the port 32A of passageway 32 a sealing sleeve denoted generally by the reference character 36. This annular sleeve 36 is in axial alignment with the passage 32 and may move between limits in an axial direction within the port 32A. An annular spring washer 40 is positioned to urge the sleeve 36 upwardly in the FIGS. 2 and 6 against the face 17A of the valve part 17. This resilient spring washer 40 is carried on a shoulder 32B defining the port 32A, and the spring 40 pushes upwardly upon the second end surface 36B whereby a first end surface 36A is urged to sealingly engage the rotatable end face 17A. A sealing engagement of the end surface 36A with valve face 17A provides direct communication between the passageway 32 and the opening 30A of conduit 30. Upon the sleeve 36 registering with an opening of a conduit of the valve part 17, either wholly or in part, then the passageway 32 is sealed off by, and is closed by a solid portion of, the valve face 17A. The valve end face 36A is preferably ground flat as is the valve face 17A and the opposite end portion surface and valve face are disposed parallel to each other.

The port 32A is of greater diameter than is the diameter of the passageway 32, and this provides a wall 32C at the outer limits of the shoulder 32B. Near the fixed face 11A where this sleeve 36 protrudes from the port, the diameter of the port is somewhat greater than the diameter at the wall 32C to provide the wall 32D.

Formed in the wall defining the port 32A, there is an annular groove 32E, which is disposed outwardly of the cylindrical wall portion 36D of the sleeve 36. Above the cylindrical wall 36D of the sleeve 36, the sleeve has an enlarged portion to provide the cylindrical wall 36E of greater diameter than of the diameter of the cylindrical wall 36D. This difference in the diameters of the walls provides an annular flat shoulder 36C as illustrated.

Disposed within the groove 32E and embracing the cylindrical wall 36D of sleeve 36 is a rubber O-ring 39. This ring 39 is of such dimension and resilient characteristic that it is compressed between the cylindrical wall of the groove 32E and the outer cylindrical wall 36D of the sleeve, and provides the usual sealing function permitting axial movement of the sleeve 36 while providing a seal against passage of fluid between the outer wall of the sleeve and the inner wall of the port. Positioned rather loosely within the groove 32E at a location above the O-ring 39 is a Teflon ring 37 and another Teflon ring 38 below the O-ring 39. These Teflon rings 37 and 38 provide their usual function of limiting the tendency of the O-ring to extrude or squeeze out of the groove. However, the Teflon rings in themselves do not provide a fluid seal and fluid under pressure may leak past the Teflon rings which may be moved axially by such fluid pressure in the groove in the usual manner.

In my preferred and improved form of sealing sleeve and associated structure, the effective area of first end surface 36A is approximately equal to the effective area of the second end surface 36B. Thus, forces tending to urge the sleeve in one axial direction or the other, insofar as fluid pressures existing at the opposite end surfaces 36A and 36B are equal, tend to be the same. It is also to be noted that the maximum diameter of the sleeve at its upper end, that is, the diameter of the upper cylindrical outer wall 36E, is approximately equal to the mean diameter of the O-ring 39. A reference cylinder coinciding with the cylindrical wall 36E would substantially bisect the Teflon rings 37 and 38 and the O-ring 39.

The shoulder 36C provides an important function in the operation of the valve. In those instances wherein the pressure of the fluid in the cavity 13, that is, in the space outwardly of the sleeve 36 and between the opposite face 17A and 11A, tends to become greater than the pressure in the passageway 32 below the port 32A, such fluid under pressure leaks downwardly between the crack or small space between wall 36E of the sleeve and wall 32D of the port. This fluid working downwardly under such great pressure enters the groove 32E above the O-ring 39 and is in position to exert an upward force on the shoulder 36C thus tending to urge the sleeve upwardly and against the valve face 17A. This shoulder 36C thus accommodates for the situation existing when the pressure in the cavity 13 exceeds the pressure in the passageway 32. When the pressure in the passageway 32 is sufficiently great relative to the pressure in the cavity 13, then the auxiliary function of shoulder 36C is not utilized.

It is to be noted that the above area of shoulder 36C plus the effective area of the end surface 36A is substantially greater than the effective area of the second end surface 36B.

Thus when the pressures in the cavity 13 and in the passageway 32 are substantially the same, or when the pressure in the passageway 32 is greater than the pressure in the cavity 13, then the pressure on second end surface 36B plus the bias of the spring 40 will exert sufficient force to hold the sleeve upwardly in good sealing engagement with the valve face 17A. However, in those instances wherein the pressure in the cavity 13 outwardly of the sleeve 36 is sufficiently greater than that encountered in the passageway 32, then such excessive fluid under pressure by exerting an upward force on the shoulder 36C still urges the sleeve 36 upwardly to maintain a good sealing engagement with the valve face 17A. Although the Teflon ring 37 is shown in FIG. 6 as engaging the shoulder 36C, it will be understood by those versed in the art that the fluid under such excess pressure will nevertheless enter the groove and be located to exert an upward force on the shoulder 36C.

By means of the valve structure shown and illustrated, a control valve which meets variable operating conditions, and particularly variations in fluid pressure encountered, is herein provided.

The present disclosure includes that contained in the appended claims as well as that of the foregoing description.

Although this invention has been described in its preferred form and preferred practice with a certain degree of particularity, it is understood that the present disclosure has been made only by way of example and that numerous changes in the details of construction and the combination and arrangement of parts and steps may be resorted to without departing from the spirit and scope of the invention as hereinafter claimed.

What is claimed is:

1. A rotary valve mechanism comprising the combination of a body having a cavity therein and having a fluid passageway therein terminating with a port at a side of said cavity, a rotatable valve part in said cavity having a face opposed to, and spaced from, said side of the cavity and rotatable on the axis of the valve part relative to said side of the cavity while substantially maintaining said space between said face and said side, said valve part having a conduit therein terminating with an opening at said face, a sealing sleeve positioned in, and movable axially of, the said port, the bore of said sleeve being in communication with the conduit in said body, said sleeve having a first end surface generally parallel with the plane of, and engageable with, the said face of the valve part, said sleeve having an opposite second end surface exposed at said port to pressure of fluid in said passageway, the effective areas of said first and second end faces being so proportioned as to provide for desired proportioning of the forces on said sleeve in opposite axial directions by the fluid pressure at said end faces, said sleeve having an outer cylindrical wall and an annular shoulder extending radially outwardly of said cylindrical wall directed oppositely of said first end surface, said body having an annular groove formed therein around said port at a distance from said side of the cavity and disposed radially outwardly of said cylindrical wall of the sleeve, resilient sealing means disposed in said groove and extending radially inward therefrom in sealing engagement with said cylindrical wall of the sleeve for maintaining a seal between the said sleeve and said body at said port, the outer cylindrical wall of said groove and said cylindrical wall of said sleeve being radially spaced substantially equidistantly from a reference cylinder coinciding with the circumference of said annular shoulder whereby said reference cylinder susbtantially bisects said sealing means, said sleeve and said body at said side of the cavity having a clearance therebetween and extending from said side of the cavity to said annular groove, said clearance permitting fluid in said cavity to leak into said groove and into engagement with said annular shoulder in said sleeve, fluid pressure on said annular shoulder opposing fluid pressure on said first end surface of the sleeve in accordance with the effective area of said shoulder.

2. A rotary valve mechanism as claimed in claim 1 in which the effective areas of said first and second end surfaces are so proportioned as to be substantially equal, and including resilient means carried by the body and operatively engaging said sleeve, the resilient means being biased to urge said first end surface of the sleeve against said face of the rotatable valve part.

3. A rotary valve mechanism as claimed in claim 1 in which the said annular shoulder extends radially outward to a reference cylinder traversing said sealing member to cooperate with the confining walls of the groove in retaining the sealing member in said annular groove.

4. In a rotary valve mechanism having a body and a rotatable valve part carried in a cavity in the body and rotatable therein, the said valve part having a face to be sealingly engage at a fluid port in the body directed toward said face, the combination of a sealing sleeve disposed in said port and extendable into the cavity to sealingly interengage a first end surface of the sleeve with said face of the valve part, said sleeve having a second end surface at its other end oppositely directed from said first end surface and exposed to fluid in said fluid port, the effective areas of said first and second end surfaces being proportioned to provide the desired ratio of opposing forces on the sleeve derived from fluid pressure on the respective first and second end surfaces, an annular wall defining said port having an annular groove formed therein at a distance from said cavity, the inner diameter of said port at a first axial end of the groove closest to said cavity being greater than the inner diameter of said port at a second axial end of the groove farthest from said cavity, said sleeve having a cylindrical outer wall disposed opposite said groove and having an annular shoulder extending radially outwardly of said cylindrical outer wall, a sealing member disposed in said groove and extending radially inward into sealing engagement with said cylindrical outer wall, said sealing member being confined between the combination of the said shoulder and the groove wall at said first axial end and the groove wall at said second axial end of the groove, said sleeve and said annular wall defining the port between said shoulder and said cavity providing a clearance therebetween whereby fluid from said cavity may enter around the sleeve into said groove and in engagement with said shoulder, the effective area of said shoulder being so proportioned to the effective area of said first end surface that a desired ratio of forces by fluid pressure on the shoulder and on first end surface is obtained.

5. The combination claimed in claim 4 and including a resilient member carried by the body and engaging the said sleeve, said resilient member being biased to resiliently urge the sleeve toward said face of the rotatable valve part.

6. The combination in claim 4 and in which said annular shoulder has an effective area less than the effective area of said first end surface, and in which the effective area of said first end surface is substantially equal to the effective area of said second end surface.

7. In a valve mechanism having a valve face rotatable in a cavity of the valve body relative to a port in the valve body, the combination of a sleeve disposed in the port and axially movable therein to maintain sealing engagement with said face at said port, the valve body having an annular groove disposed in the wall of the port and radially outwardly of the sleeve, a resilient sealing member disposed in said groove and extending radially inward into sealing engagement with the sleeve to maintain a fluid seal between the port wall and sleeve, said sleeve at a first end being engageable with said face, said sleeve at a second and opposite end being so disposed and exposed to fluid in said port to be subjected to fluid pressure in said port urging the sleeve toward said valve face, the said sleeve adjacent said first end having an outer diameter greater than the outer diameter of the sleeve at a location radially inward of said groove to provide an annular shoulder directed toward said second end of the sleeve, said shoulder extending radially outward a distance substantially less than the outer wall of said groove whereby a reference cylinder coinciding with said shoulder substantially bisects the space between said outer wall of the groove and the outer wall of the sleeve at said location radially inward of said groove, the sleeve adjacent said first end of greater diameter being spaced from the opposed wall of the port to provide sufficient clearance for fluid in said cavity to enter into said groove and between the shoulder and sealing member, the pressure of said fluid on said shoulder urging said sleeve toward said valve face.

8. The combination claimed in claim 7 and including a spring operatively connecting said sleeve and body for resiliently urging said sleeve toward said valve face.

9. In a valve mechanism, having one part rotatable relative to the other one part, having a valving face and the other part having a port directed toward said face for control of fluid from said port, the combination at said port of a sleeve disposed in said port and axially movable therein toward said face, said sleeve having a first end surface adapted to engage said face upon movement of the sleeve against said face and exposed to pressure of fluid intermediate of said face and first end surface, said sleeve having a second opposite end face directed away from said face and exposed to pressure of fluid in said port, said first and second end surfaces having substantially equal effective areas subjected to said fluid pressures, a spring carried by said other part and disposed to resiliently bias said sleeve toward said face, said port having a wall concentric with, and accommodating, said sleeve at said port, said port wall having a first annular shoulder extended radially inward and directed away from said face, said sleeve having a cylindrical outer wall and a second annular shoulder extended radially outward and directed away from said first end surface of the sleeve, said port wall having a third annular shoulder extending radially inward and directed toward and in axial alignment with said first and second shoulders, an annular resilient sealing member disposed within said port between said port wall and said cylindrical outer wall of the sleeve to provide a seal therebetween, said sealing member being confined between the said first and second shoulders at one axial end and the third shoulder at the other axial end, said sleeve between said first end surface and said second shoulder having such clearance with said port wall that fluid outwardly of said sleeve between said valve parts may enter between said cylindrical outer wall of the sleeve and said port wall and engage said first and second shoulders, pressure of fluid on said second shoulder urging said sleeve toward said face in opposition to fluid pressure on said first end surface urging the sleeve away from said face.

10. The combination claimed in claim 9 and in which said first and second annular shoulders are of substantially equal radial extent, and said third annular shoulder is of substantially the same radial extent as both said first and second annular shoulders.

11. The combination claimed in claim 9 and in which said first and third annular shoulders define the axial ends of a groove in said port wall, and in which said cylindrical outer wall of the sleeve extends axially from said second shoulder to beyond said third shoulder.

References Cited

UNITED STATES PATENTS

| | | | |
|---|---|---|---|
| 2,796,230 | 6/1957 | Grove | 251—172 |
| 2,925,095 | 2/1960 | Bates | 251—172 X |
| 2,988,108 | 6/1961 | Malmquist | 251—174 X |

CLARENCE R. GORDON, Primary Examiner

U.S. Cl. X.R.

251—174, 182